US008976783B2

(12) United States Patent
Chung et al.

(10) Patent No.: US 8,976,783 B2
(45) Date of Patent: Mar. 10, 2015

(54) METHOD AND APPARATUS FOR ASSURING VOICE OVER INTERNET PROTOCOL SERVICE

(75) Inventors: Li-Jin Chung, Lincroft, NJ (US);
Yu-Lein Kung, Holmdel, NJ (US);
Ching-Chyuan Shieh, Princeton, NJ (US); Jeffrey Stein, Cliffwood, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1559 days.

(21) Appl. No.: 11/960,367

(22) Filed: Dec. 19, 2007

(65) Prior Publication Data

US 2009/0161657 A1    Jun. 25, 2009

(51) Int. Cl.
*H04L 12/66* (2006.01)
(52) U.S. Cl.
CPC ................................. *H04L 12/66* (2013.01)
USPC ........... 370/352; 370/356; 370/354; 370/355; 370/248; 370/401; 370/353
(58) Field of Classification Search
USPC ................... 370/352–356, 248, 401
See application file for complete search history.

(56) References Cited

U.S. PATENT DOCUMENTS

| 6,775,236 | B1 * | 8/2004 | Scrandis et al. | 370/241 |
|---|---|---|---|---|
| 6,993,013 | B1 * | 1/2006 | Boyd | 370/352 |
| 7,746,844 | B1 * | 6/2010 | Vijendra et al. | 370/351 |
| 7,773,727 | B1 * | 8/2010 | Eslambolchi et al. | 379/14.01 |
| 7,797,420 | B1 * | 9/2010 | Mackie et al. | 709/224 |
| 7,881,189 | B1 * | 2/2011 | Bajpay et al. | 370/218 |
| 2004/0261116 | A1 * | 12/2004 | Mckeown et al. | 725/109 |
| 2005/0075992 | A1 * | 4/2005 | Gavan et al. | 706/10 |
| 2006/0069776 | A1 * | 3/2006 | Shim et al. | 709/225 |
| 2006/0098625 | A1 * | 5/2006 | King et al. | 370/352 |
| 2006/0182034 | A1 * | 8/2006 | Klinker et al. | 370/238 |
| 2007/0019559 | A1 * | 1/2007 | Pittelli et al. | 370/248 |
| 2007/0019618 | A1 * | 1/2007 | Shaffer et al. | 370/352 |
| 2007/0061443 | A1 * | 3/2007 | Chavda | 709/224 |
| 2007/0121596 | A1 * | 5/2007 | Kurapati et al. | 370/356 |
| 2007/0165818 | A1 * | 7/2007 | Savoor et al. | 379/201.12 |
| 2008/0316931 | A1 * | 12/2008 | Qiu et al. | 370/245 |
| 2009/0019147 | A1 * | 1/2009 | Ahlers et al. | 709/224 |
| 2009/0109959 | A1 * | 4/2009 | Elliott et al. | 370/352 |
| 2009/0141877 | A1 * | 6/2009 | McKenna | 379/133 |

* cited by examiner

*Primary Examiner* — Khaled Kassim

(57) ABSTRACT

In one embodiment, the present invention is a method and apparatus for assuring Voice over Internet Protocol service. In one embodiment, a system for assuring Voice over Internet Protocol service includes a performance management platform for collecting performance management data from a plurality of sources in a Voice over Internet Protocol network, for detecting at least one abnormal event in accordance with the collected performance management data, and for reporting a volume of traffic in the Voice over Internet Protocol network and a trouble ticketing system for generating a ticket identifying a root cause of the abnormal event(s).

10 Claims, 3 Drawing Sheets

METHOD AND APPARATUS FOR ASSURING VOICE OVER INTERNET PROTOCOL SERVICE

FIELD OF THE INVENTION

The present invention relates generally to Voice over Internet Protocol (VoIP) communications and relates more particularly to a VoIP service assurance model.

BACKGROUND OF THE INVENTION

Although Voice over Internet Protocol (VoIP) technology has been in use for several years, VoIP service assurance for performance, reliability, and maintenance is a relatively new field in the network management arena. In order to assure VoIP service, it is necessary to identify and respond to potential network- or service-related events in a timely manner.

Thus, there is a need in the art for a method and apparatus for assuring Voice over Internet Protocol service.

SUMMARY OF THE INVENTION

In one embodiment, the present invention is a method and apparatus for assuring Voice over Internet Protocol service. In one embodiment, a system for assuring Voice over Internet Protocol service includes a performance management platform for collecting performance management data from a plurality of sources in a Voice over Internet Protocol network, for detecting at least one abnormal event in accordance with the collected performance management data, and for reporting a volume of traffic in the Voice over Internet Protocol network and a trouble ticketing system for generating a ticket identifying a root cause of the abnormal event(s).

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention is method and apparatus for assuring Voice over Internet Protocol (VoIP) service. One embodiment of a VoIP service model according to the present invention collects data from a plurality of sources in a VoIP network and, based on analysis of the collected data, identifies potential network- and/or service-related events in substantially real time. This facilitates proactive, substantially real-time network and service management and performance reporting. Although the present invention is described with the context of VoIP communications, those skilled in the art will appreciate that the present invention may be deployed for use with other IP applications, including, for example IP television (IPTV).

Figure 1:
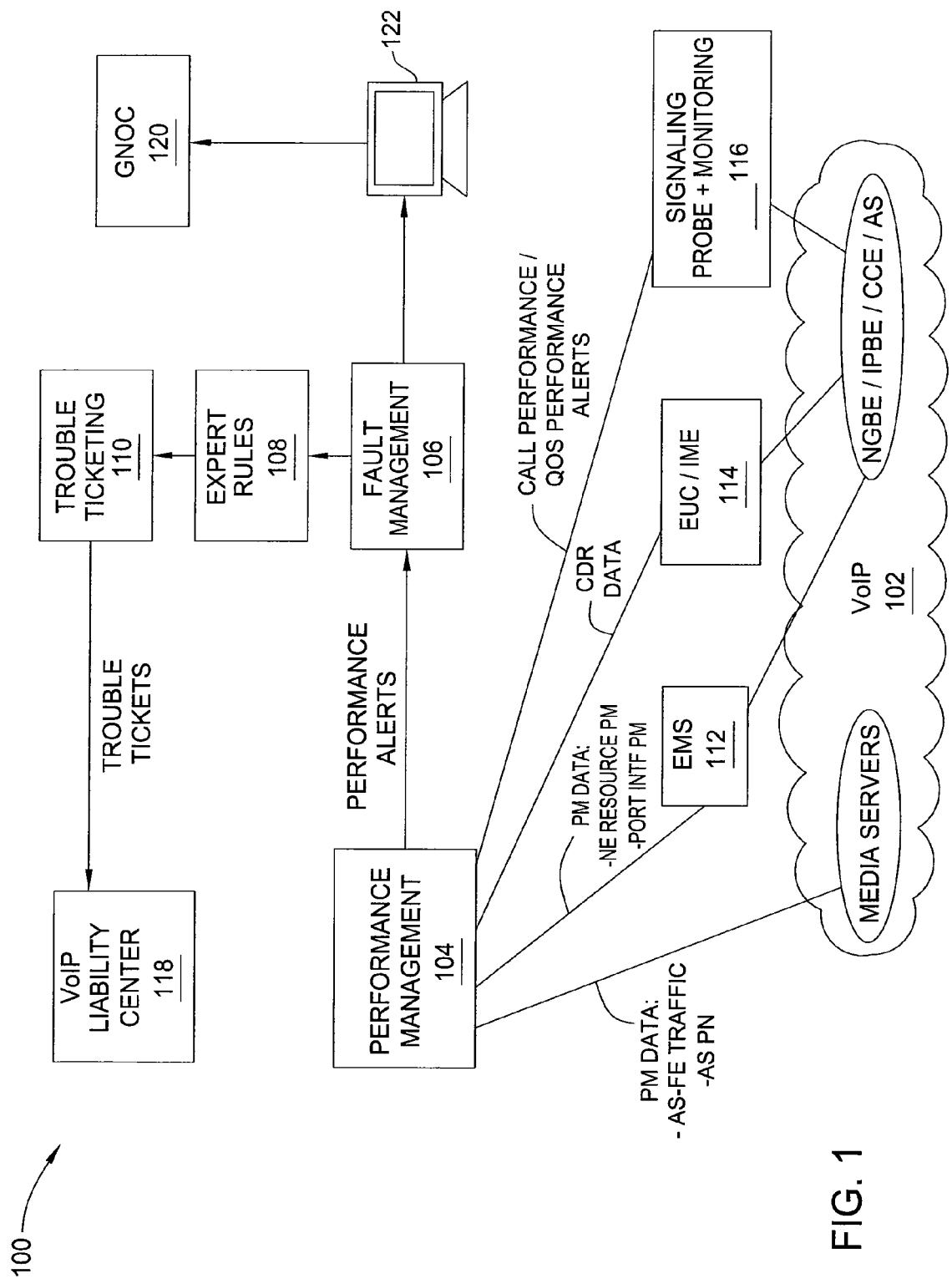
FIG. 1 is a schematic diagram illustrating one embodiment of a VoIP service assurance model, according to the present invention.

FIG. 1 is a schematic diagram illustrating one embodiment of a VoIP service assurance model 100, according to the present invention. As illustrated, the model 100 comprises a VoIP network 102, a performance management platform 104, a fault management operating system (OS) 106, an expert rule system 108, and a trouble ticketing system 110.

In one embodiment, the VoIP network 102 includes media servers, network gateway border elements (NGBEs), IP border elements (IPBEs), call control elements (CCEs), and application servers (AS's).

In one embodiment, the performance management platform 104 is a Concept of One (COO) performance management platform (e.g., a Performance Management Operation Support System (PMOSS)) that provides end-to-end performance reporting, real-time performance surveillance, and network management controls. The performance management platform 104 is communicatively coupled to the VoIP network 102 and to the fault management operating system (OS) 106. In one embodiment, the performance management platform 104 collects performance management data from four main sources: (1) an element management system (EMS) 112; (2) a network element, such as a media server in the VoIP network 102; (3) an enterprise usage collector (EUC)/IntermediatE (ImE) 114; and (4) a signaling probe and monitoring module 116. The performance management platform 104 processes the collected data to detect abnormal network or service events and to report traffic volume, and generates performance alerts when abnormal network or service events are detected. Algorithms for generating the alerts may vary depending on the sources of the data used to generate the alerts. In one embodiment, the performance management platform 104 also performs some correlation of alerts that appear to be related. In a further embodiment, the performance management platform 104 detects "normal" network or service events that can also give an indication of VoIP network traffic volume. For instance, calculating the number of "call attempts" can help measure network traffic, which in turn helps plan network capacity.

The EMS 112 provides an interface for managing elements of the VoIP network 102. In one embodiment, the management functions supported by the EMS 112 include provisioning, fault monitoring, and performance monitoring. The EMS provides management information base (MIB) performance records to the performance management platform 104. The EUC/ImE 114 is a call detail record (CDR) collection platform for elements of the VoIP network 102. The EUC/ImE 114 sends raw (i.e., not subject to additional filtering) call detail records (e.g., including call endpoints and time) from various network elements to the performance management platform 104. The signaling probe and monitoring module 116 probes the elements of the VoIP network 102 for signaling protocols (e.g., data generated when the network elements communicate to set up a call) and correlates call flows for end-to-end call trace (e.g., for troubleshooting). Thus, the signaling probe and monitoring module 116 provides data regarding VoIP signaling performance and anomalies to the performance management platform 104. In one embodiment, the signaling probe and monitoring module 116 also provides the ability to measure per-call-based performance/service measurements.

The fault management OS 106 is the target fault management operating system for elements of the VoIP network 102 and for performance alerts produced by the performance management platform 104. The fault management OS 106 receives the performance alerts generated by the performance management platform 104 (as well as data from other sources) and correlates the performance alerts and fault alarms. Correlation of alerts allows the fault management OS 106 to identify the root case of the abnormal network or service events that trigger the alarms. For instance, a plurality of alerts pointing to abnormally low network traffic may indicate a subtle problem with network access, while a plurality of alerts pointing to an unexpected peak in network traffic might indicate a catastrophe impacting the ability of the VoIP network to serve all call customers. Correlation also allows the fault management OS 106 to suppress alerts that are indicative of a common network or service event (e.g., so that the VoIP service assurance model 100 is not flooded with redundant alerts). The fault management OS 106 in turn provides the correlated performance alerts to the expert rule system 108, to which the fault management OS 106 is communicatively coupled. In one embodiment, the fault management OS is a global fault platform (GFP).

In a further embodiment, fault management OS also provides read-only versions of the correlated performance alerts to a global network operations center (GNOC) 120, which monitors the overall network traffic condition (not necessarily specialized to VoIP). In one embodiment, the GNOC 120 employs a GUI or display 122 for display of performance alerts and traffic volume.

The expert rule system 108 receives the correlated alerts from the fault management OS 106 for further business automation before the correlated alerts are passed to the trouble ticketing system 110, to which the expert rule system 108 is communicatively coupled. In one embodiment, the expert rule system 108 is a rules-you-build-yourself (RUBY) system.

The trouble ticketing system 110 creates trouble tickets (e.g., textual-based indications) based on the correlated alerts provided by the expert rule system 108. Based on the correlated alerts, the trouble ticketing system 110 creates actionable tickets. In one embodiment, a ticket identifies a network- and/or service-related event that requires corrective action. In a further embodiment, a ticket identifies a source of the network- and/or service-related event. In a further embodiment, the tickets suggest corrective actions that may resolve the network- and/or service-related event (e.g., a "Methods and Procedures" guide that specifies how certain problems should be handled, a selectable menu of actions that can be annotated to reflect technician progress, or a hyperlink to on-line help documents). In a further embodiment still, a ticket triggers a test and provides the results of the test. In one embodiment, the trouble ticketing system 110 provides the tickets to a VoIP work/liability center 118 for action. In one embodiment, the VoIP service assurance model 100 tracks ticket opening and closing times in order to measure a mean time to repair.

The VoIP service assurance model 100 thus collects data from a plurality of sources in a VoIP network and, based on analysis of the collected data, identifies potential network- and/or service-related events in substantially real time. This facilitates proactive, substantially real-time network and service management and performance reporting for the VoIP network 102, which may include a variety of network elements originating from different vendors and manufacturers.

Figure 2:
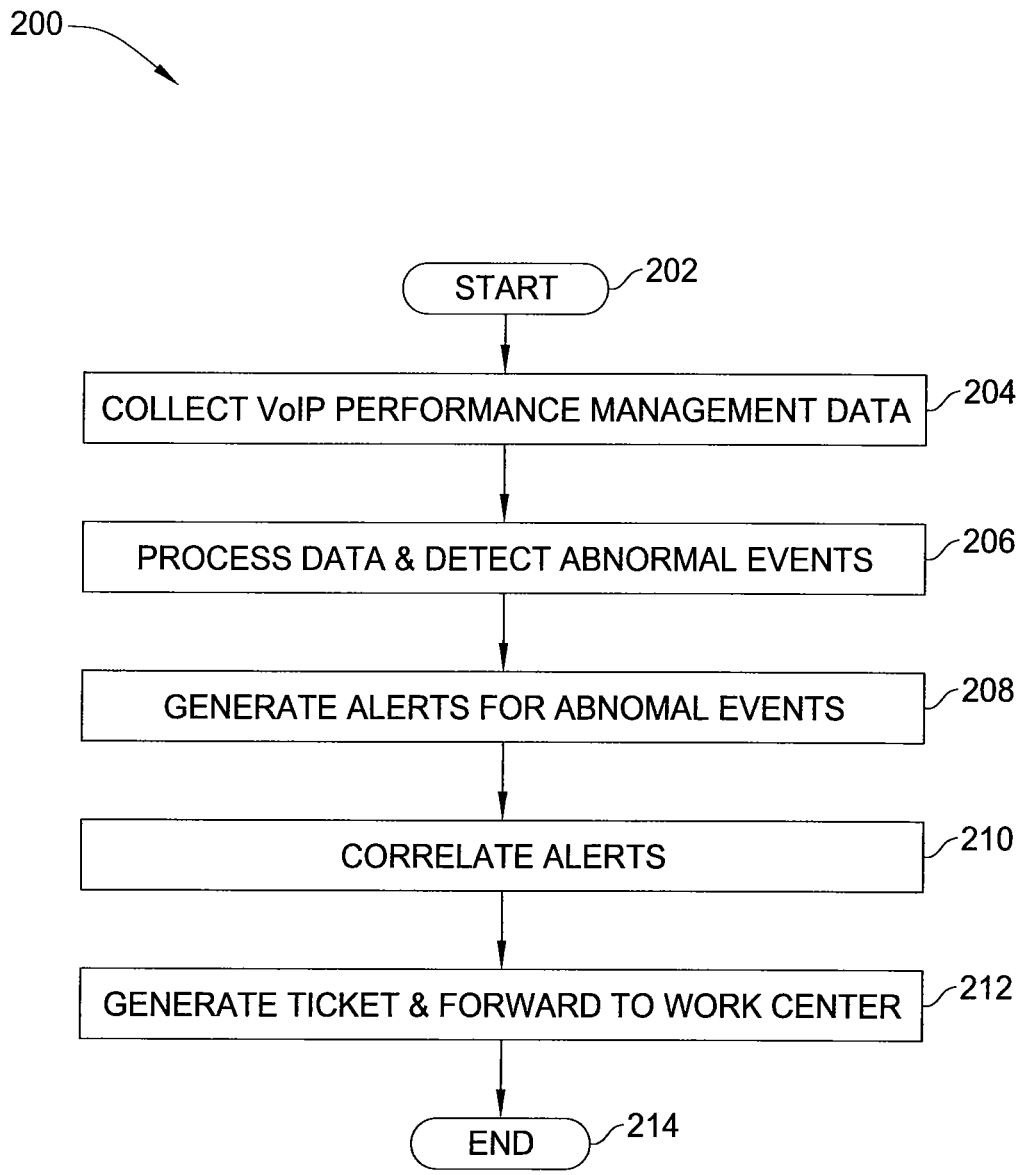
FIG. 2 is a flow diagram illustrating one embodiment of a method for VoIP service assurance, according to the present invention.

FIG. 2 is a flow diagram illustrating one embodiment of a method 200 for VoIP service assurance, according to the present invention. The method 200 may be implemented, for example, by the VoIP service assurance model 100 illustrated in FIG. 1.

The method 200 is initialized at step 202 and proceeds to step 204, where the performance management platform collects VoIP network performance management data. As discussed above, in one embodiment the performance management data includes at least one of: signaling performance measurements and anomalies, call detail records, and MIB-based performance measurements. In one embodiment, the performance management data is collected from an EMS, an EUC/ImE, and a signaling probe and monitoring module.

In step 206, the performance management platform processes the collected performance management data and detects abnormal network and/or service events contained therein. The method 200 then proceeds to step 208, where the performance management platform generates alerts for the abnormal events.

In step 210, the fault management OS correlates at least a subset of the alerts generated in step 208 in order to identify the root cause of the abnormal events. The method 200 then proceeds to step 212 and generates a trouble ticket indicative of the cause. The method 200 forwards the trouble ticket to the VoIP work center for corrective action before terminating in step 214.

Figure 3:
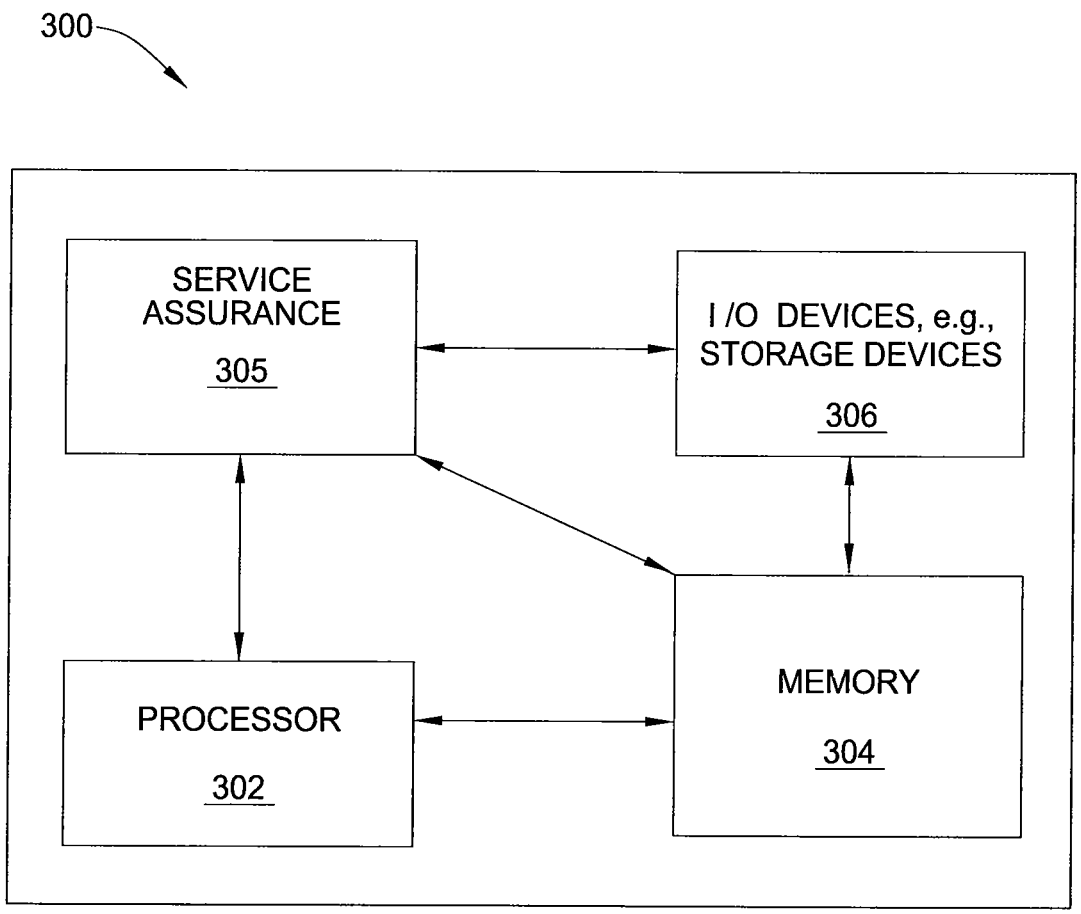
FIG. 3 is a high level block diagram of the service assurance method that is implemented using a general purpose computing device.

FIG. 3 is a high level block diagram of the service assurance method that is implemented using a general purpose computing device 300. In one embodiment, a general purpose computing device 300 comprises a processor 302, a memory 304, a service assurance module 305 and various input/output (I/O) devices 306 such as a display, a keyboard, a mouse, a modem, and the like. In one embodiment, at least one I/O device is a storage device (e.g., a disk drive, an optical disk drive, a floppy disk drive). It should be understood that the service assurance module 305 can be implemented as a physical device or subsystem that is coupled to a processor through a communication channel.

Alternatively, the service assurance module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the service assurance module 305 for VoIP service assurance described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing an abnormal event in a voice over internet protocol network, comprising:

collecting, by a processor, performance management data from a plurality of sources in the voice over internet protocol network, wherein the plurality of sources comprises an element management system for providing management information base performance records, a network element, a call detail record collection platform for sending call detail records associated with network elements in the voice over internet protocol network and a signaling probe and monitoring module for probing the network elements for signaling protocols and for providing data regarding signaling performance and anomalies;

detecting, by the processor, the abnormal event in the voice over internet protocol network in accordance with the performance management data that is collected;

generating, by the processor, a ticket identifying a root cause of the abnormal event in the voice over internet protocol network and including a corrective action to resolve the abnormal event in the voice over internet protocol network, wherein the root cause is identified by correlating with one another a subset of a plurality of alerts that is generated, wherein the correlating suppresses alerts that are indicative of a common network event; and forwarding, by the processor, the ticket to a voice over internet protocol liability center for implementing the corrective action;

wherein the performance management data comprises signaling performance measurements.

2. The method of claim 1, further comprising: performing business automation on the ticket before forwarding the ticket.

3. A non-Transitory computer readable medium storing a plurality of instructions, which when executed by a processor, cause the processor to perform operations for processing an abnormal event in a voice over internet protocol network, the operations comprising:

collecting performance management data from a plurality of sources in the voice over internet protocol network, wherein the plurality of sources comprises an element management system for providing management information base performance records, a network element, a call detail record collection platform for sending call detail records associated with network elements in the voice over internet protocol network and a signaling probe and monitoring module for probing the network elements for signaling protocols and for providing data regarding signaling performance and anomalies;

detecting the abnormal event in the voice over internet protocol network in accordance with the performance management data that is collected;

generating a ticket identifying a root cause of the abnormal event in the voice over internet protocol network and including a corrective action to resolve the abnormal event in the voice over internet protocol network, wherein the root that is generated, wherein the correlating suppresses alerts that are indicative of a common network event; and forwarding the ticket to a voice over internet protocol liability center for implementing the corrective action;

wherein the performance management data comprises signaling performance measurements.

4. The tangible computer readable medium of claim 3, further comprising:

performing business automation on the ticket before forwarding the ticket.

5. A system for processing an abnormal event in a voice over internet protocol network, comprising:

a processor; and a computer-readable medium storing a plurality of instructions which, when executed by the processor, cause the processor to perform operations, the operations comprising:

receiving an indication of the abnormal event in the voice over internet protocol network from a performance management platform for collecting performance management data from a plurality of sources in the voice over internet protocol network, for detecting the abnormal event in the voice over internet protocol network in accordance with the performance management data that is collected, wherein the plurality of sources comprises an element management system for providing management information base performance records, a network element, a call detail record collection platform for sending call detail records associated with network elements in the voice over internet protocol network and a signaling probe and monitoring module for probing the network elements for signaling protocols and for providing data regarding signaling performance and anomalies;

correlating a subset of a plurality of alerts that is generated and for identifying a root cause in accordance with the alerts that are correlated with one another, wherein the correlating suppresses alerts that are indicative of a common network event;

communicating with a trouble ticketing system for generating a ticket identifying the root cause of the abnormal event in the voice over internet protocol network and including a corrective action to resolve the abnormal event in the voice over internet protocol network; and forwarding the ticket to a voice over internet protocol liability center for implementing the corrective action;

wherein the performance management data comprises signaling performance measurements.

6. The system of claim 5, further comprising:

an expert rule system for performing business automation on the ticket before the ticket is forwarded to the voice over internet protocol liability center.

7. The system of claim 5, wherein the element management system is further for providing the performance management data.

8. The system of claim 5, wherein the abnormal event comprises a network event.

9. The system of claim 5, wherein the performance management data comprises signaling performance anomalies.

10. The system of claim 5, wherein the performance management data comprises call detail records.

* * * * *